United States Patent [19]
Chavez, Jr.

[11] Patent Number: 6,141,333
[45] Date of Patent: Oct. 31, 2000

[54] TIERED SATELLITE INTERNET DELIVERY SYSTEM

[75] Inventor: David L. Chavez, Jr., Thornton, Colo.

[73] Assignee: Lucent Technologies Inc., Murray Hill, N.J.

[21] Appl. No.: 08/944,020

[22] Filed: Sep. 30, 1997

[51] Int. Cl.$^7$ .............................. H04Q 7/24; H04M 3/42
[52] U.S. Cl. ..................... 370/338; 370/352; 370/389; 379/201
[58] Field of Search ..................... 370/349, 352, 370/389, 338, 328; 709/217, 218, 219, 227, 228, 229; 379/201, 208; 455/2.1, 5.1, 6.1, 6.2, 6.3, 6.5

[56] References Cited

U.S. PATENT DOCUMENTS

| | | | |
|---|---|---|---|
| 5,173,900 | 12/1992 | Miller et al. | 370/110.1 |
| 5,381,476 | 1/1995 | Kimoto et al. | 380/5 |
| 5,392,066 | 2/1995 | Fisher et al. | 348/8 |
| 5,535,229 | 7/1996 | Hain, Jr. et al. | 371/53 |
| 5,547,202 | 8/1996 | Tsumura | 463/29 |
| 5,872,588 | 2/1999 | Aras et al. | 455/2 |
| 5,915,207 | 6/1999 | Doe et al. | 370/338 |
| 5,936,949 | 8/1999 | Pasternak et al. | 370/328 |
| 5,991,306 | 11/1999 | Burns et al. | 370/389 |
| 5,999,526 | 12/1999 | Garland et al. | 370/352 |
| 6,005,870 | 12/1999 | Leung et al. | 370/338 |

OTHER PUBLICATIONS

Brochure: *The Fastest Internet Access Nationwide*, DirecPC, Hughes Network Systems, 11717 Exploration Lane, Germantown, MD 20876, 5 pages.

*Primary Examiner*—Alpus H. Hsu
*Assistant Examiner*—Afsar M. Qureshi
*Attorney, Agent, or Firm*—John C. Moran

[57] ABSTRACT

Interconnecting a central computer to Internet service providers (ISPs) via normal Internet interconnections to directly provide Internet service to Internet users. The central computer is responsive to requests from Internet users received via an ISP to transfer the web page to the user via a satellite connection to the user's PC. The central computer maintains a cache of frequently requested web pages each identified by a universal resource locator (URL). If the user is requesting one of the cached web pages, this web page is immediately transmitted to the user. If the central computer does not have the web page cached, the central computer makes a request to the appropriate web server, obtains the requested web page, and transfers the requested web page to the user. Further, utilizing statistical data gathered based on time of day and day of the week, the central computer automatically caches certain web pages. The central computer provides tiers of service with each tier guaranteeing a maximum amount of time before the Internet user will receive the requested data via a satellite. The central computer utilizes the tiers of service to pool requests for web pages until the maximum amount of time is approached for that tier. When the maximum amount of time is approached, the central computer broadcasts the requested web page to all Internet users requesting that web page simultaneously.

14 Claims, 12 Drawing Sheets

FIG. 13

Block 1301:
- 1303: URL ID
- 1304: NUMBER OF HITS
- 1305: HIT RATE
- 1306: TIME OF SETUP
- 1307: FIRST PREASSIGNED FIELD
- 1308: SECOND PREASSIGNED FIELD
- 1309: URL INFORMATION LOCATION
- 1311: TRANSMIT INFORMATION Block 1302:
- URL ID
- NUMBER OF HITS
- HIT RATE
- TIME OF SETUP
- FIRST PREASSIGNED FIELD
- SECOND PREASSIGNED FIELD
- URL INFORMATION LOCATION
- TRANSMIT INFORMATION

FIG. 14

Block 1401:
- 1403: URL ID
- 1404: NUMBER OF HITS
- 1405: HIT RATE
- 1406: TIME OF SETUP
- 1407: URL INFORMATION LOCATION
- 1408: TRANSMIT INFORMATION Block 1402:
- URL ID
- NUMBER OF HITS
- HIT RATE
- TIME OF SETUP
- URL INFORMATION LOCATION
- TRANSMIT INFORMATION

FIG. 15

| URL ID | DAY OF WEEK | TIME OF DAY |
|--------|-------------|-------------|
|        |             |             |
|        |             |             |
|        |             |             |
|        |             |             |
|        |             |             |
|        |             |             |
|        |             |             |

TIERED SATELLITE INTERNET DELIVERY SYSTEM

TECHNICAL FIELD

This invention relates to data communication switching, and, in particular, to the delivery of Internet data via a satellite.

BACKGROUND OF THE INVENTION

At present, Internet service providers (ISPs) cannot offer a high grade of Internet service irrespective of geographical regions. In addition, computing resources of the Internet service providers is being stretched by the number of Internet users being added month by month and by the increased level of service being demanded by those users. In addition, there is no assurance that high bandwidth Internet service can be acquired using wired telecommunication facilities, and there is no easy method for ISP to offer different tiers of service (in terms of bandwidth and response time) to different customers. These limitations are particularly true where ISDN facilities or analog facilities using modems are utilized by the ISP.

An improvement over the utilization of modems or ISDN facilities is the DirecPCTurbo Internet service of Hughes Network Systems. This service is explained in greater detail with respect to FIG. 1 in the Detailed Description. In essence, the DirecPCTurbo Internet service allows an Internet user to interact via their PC with a web site via an ISP. The information to be downloaded to the Internet user is then transferred from the web site to the network operation center (NOC) of the DirecPCTurbo service. The NOC then utilizes a satellite to transfer this information to the Internet user's PC via the user's own satellite dish. The problems with the DirecPCTurbo Internet service are as follows. First, regardless of how many times a web site has experienced a hit, for each hit, the data must be transferred from the web site to the NOC for transmission via the satellite to each individual user. This type of operation increases the cost of providing service for users who are accessing often-visited web sites and decreases the number of users that can receive service. Further, the service provides only one type of bandwidth and response time. Also, the pricing plans associated with the service assume the same type of bandwidth and response time but vary in the amount of money that will be paid based on the total amount of data transferred per month and the times of day that the transfers take place.

SUMMARY OF THE INVENTION

This invention is directed to solving these problems and other disadvantages of the prior art. In accordance with the invention, a central computer interconnects to Internet service providers (ISPs) via normal Internet interconnections. The central computer is responsive to requests from Internet users received via an ISP to transfer the web page to the user via a satellite connection to the user's PC. The central computer maintains a cache of frequently requested web pages each identified by a universal resource locator (URL). If the user is requesting one of the cached web pages, this web page is immediately transmitted to the user. If the central computer does not have the web page cached, the central computer makes a request to the appropriate web server, obtains the requested web page, and transfers the requested web page to the user. The central computer maintains statistics on the use of various web pages; and when a web page is being requested with sufficient regularity, the central computer caches that web page. In addition, the central computer removes cached web pages that are not being accessed for a defined period of time. Further, utilizing statistical data gathered based on time of day and day of the week, the central computer automatically caches certain web pages.

Advantageously, the central computer provides tiers of service with each tier guaranteeing a maximum amount of time before the Internet user will receive the requested data via a satellite. The central computer utilizes the tiers of service to pool requests for web pages until the maximum amount of time is approached for that tier. When the maximum amount of time is approached, the central computer broadcasts the requested web page to all Internet users requesting that web page simultaneously.

Other and further aspects of the present invention will become apparent during the course of the following description and by reference to the accompanying drawing.

BRIEF DESCRIPTION OF THE DRAWING

FIGS. 10–18 illustrate tables for use with the invention.

DETAILED DESCRIPTION

Figure 1:
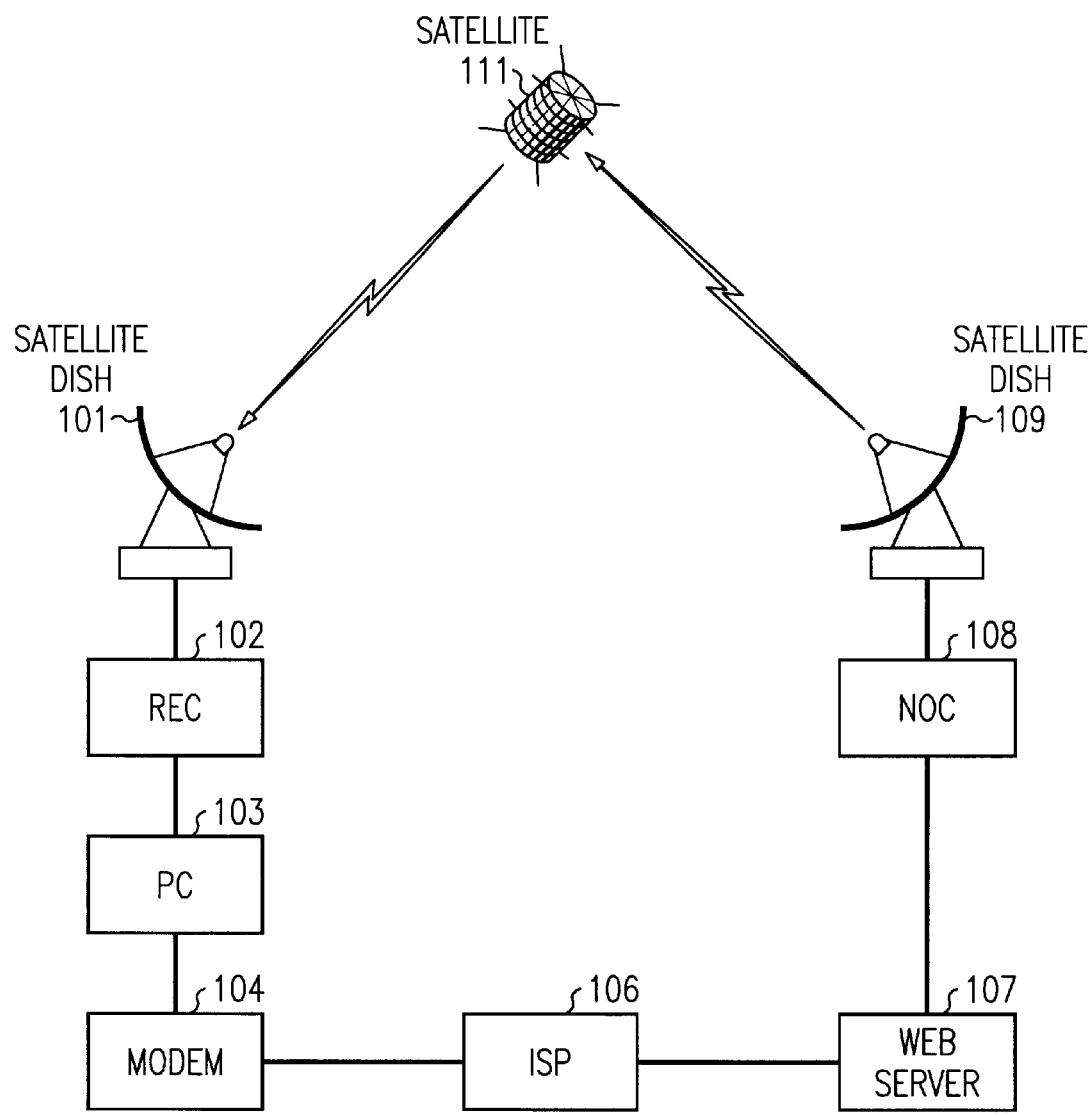
FIG. 1 illustrates a prior art satellite system for providing data from an Internet web server to Internet users.

FIG. 1 illustrates a prior art system for providing Internet information via satellite. In the prior art, a user utilizing personal computer (PC) 103 transmits a request for a web page (URL request) to web server 107 via modem 104 and ISP 106. Web server 107 is responsive to the request for the particular URL to transmit the web page associated with that URL to network operation center (NOC) 108. NOC 108 then transmits the information to PC 103 via satellite antenna 109, satellite 111, user satellite dish 101, and receiver 103. This transmission occurs as soon as there is an idle channel on the uplink between NOC 108 and satellite 111. The disadvantage of this arrangement is, that if a particular web site is being accessed at a high rate for a particular page (URL), web server 107 will be continuously transferring the same information to NOC 108 for transmission to each of a number of users. Note, one skilled in the art could readily see that web server 107 would be a plurality of web servers interconnected to NOC 108 via appropriate telecommunication facilities.

Figure 2:
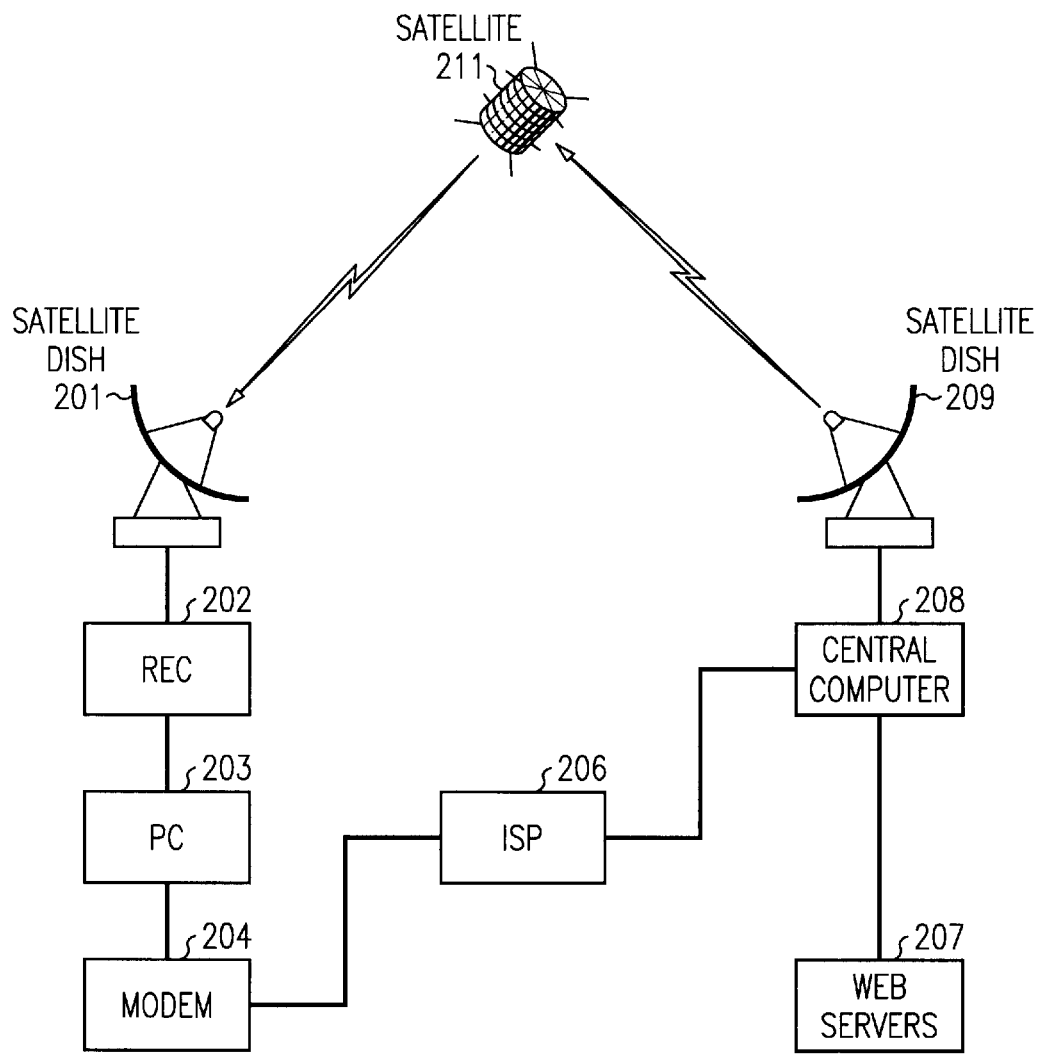
FIG. 2 illustrates, in block diagram form, a satellite delivery system of Internet data in accordance with the invention.
Figure 3:
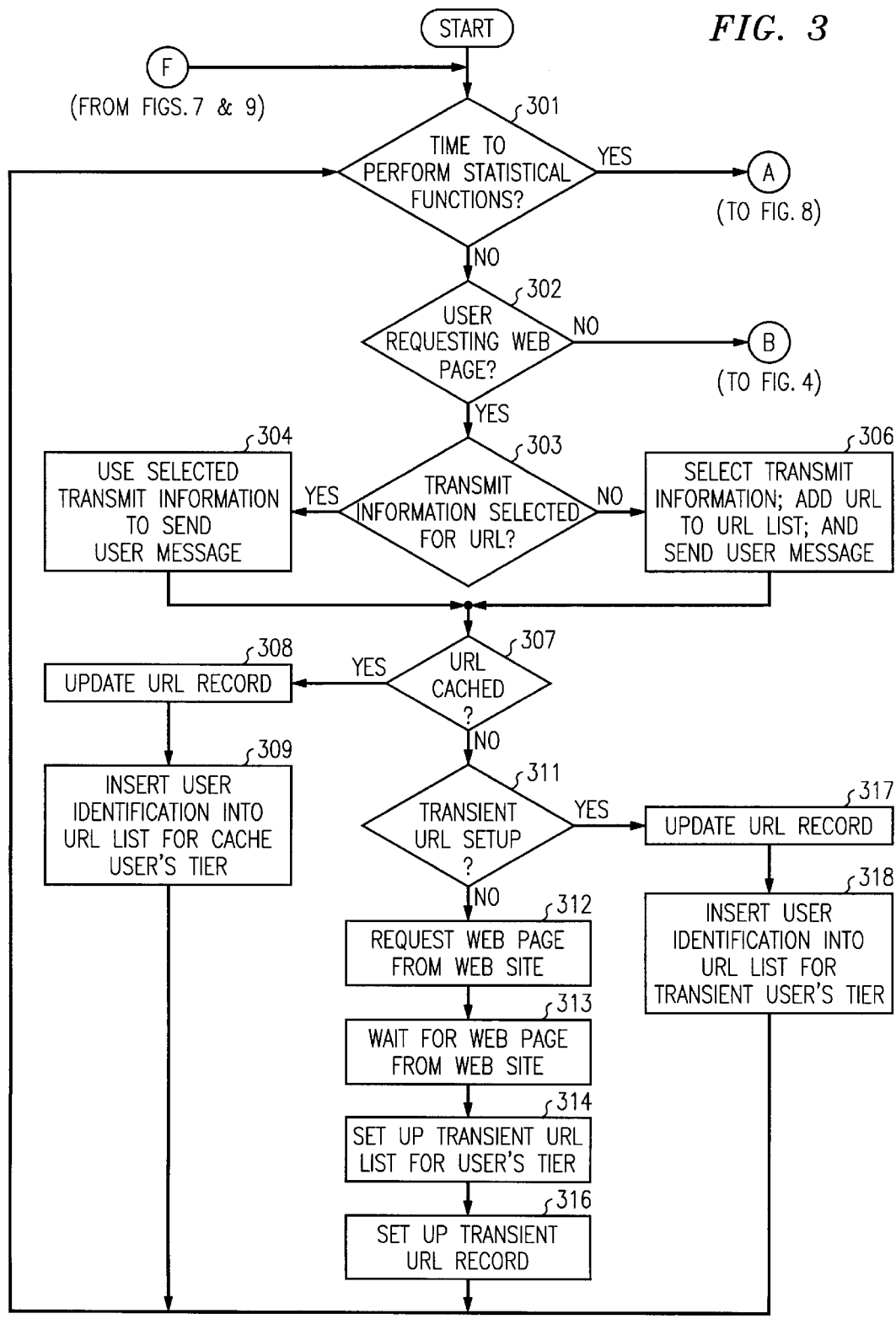
FIGS. 3–7 illustrate, in flow chart form, the steps performed by the central computer in providing data to Internet services in accordance with the invention.

FIG. 2 illustrates a system in accordance with the invention. In FIG. 2, an Internet user utilizing PC 203 is in communication with central computer 208 via modem 204 and ISP 206. Elements 204, 206, 208, and 207 are interconnected via appropriate telecommunication facilities. The Internet user on PC 203 communicates requests with only central computer 208. These user requests are for various web pages. If central computer 208 has cached a requested web page, central computer 208 determines the tier of service assigned to that Internet user. Central computer 208 pools requests from other Internet users for the requested web page until the time limit for the specified tier is about to expire. At this time, central computer 208 broadcasts the requested web page to the Internet users in the pool. Before broadcasting the requested information, central computer 208 transmits via the ISP 206 to each of the requesting PCs the channel number and sequence number which will be used to transmit the web page via satellite 211 to each of the user satellite dishes such as satellite dish 201. If a higher tier is going to receive a web page associated with a specified URL, all users in lower tiers waiting to receive that web page will also receive the same broadcast as users in the higher tier.

If central computer 208 has not cached the requested web page, central computer 208 contacts the appropriate web server in web servers 207 to obtain the web page. After waiting and obtaining the web page, central computer 208 transmits this web page within the time period specified for the tier assigned to the requesting Internet user. Central computer 208 stores the web page received from web servers 207 for a predefined amount of time so as to determine if other users will be requesting this web page. If a predefined number of requests are received within the predefined amount of time, central computer 208 will cache the web page. Until the web page is cached or removed, the web page is referred to as a transient URL.

Central computer 208 maintains statistics on the utilization of cached web pages. When a cached web page has not been utilized for a predetermined amount of time, that web page is removed from the cache by central computer 208. If an Internet user later requests the removed web page, central computer 208 accesses web servers 207 to obtain a new copy. In addition, central computer 208 periodically requests updated copies of the cached web pages from web servers 207. Also, central computer 208 maintains usage statistics of various web pages and utilizes these statistics to precache web pages which statistically have been shown to be utilized at certain times of the week.

Figure 9:
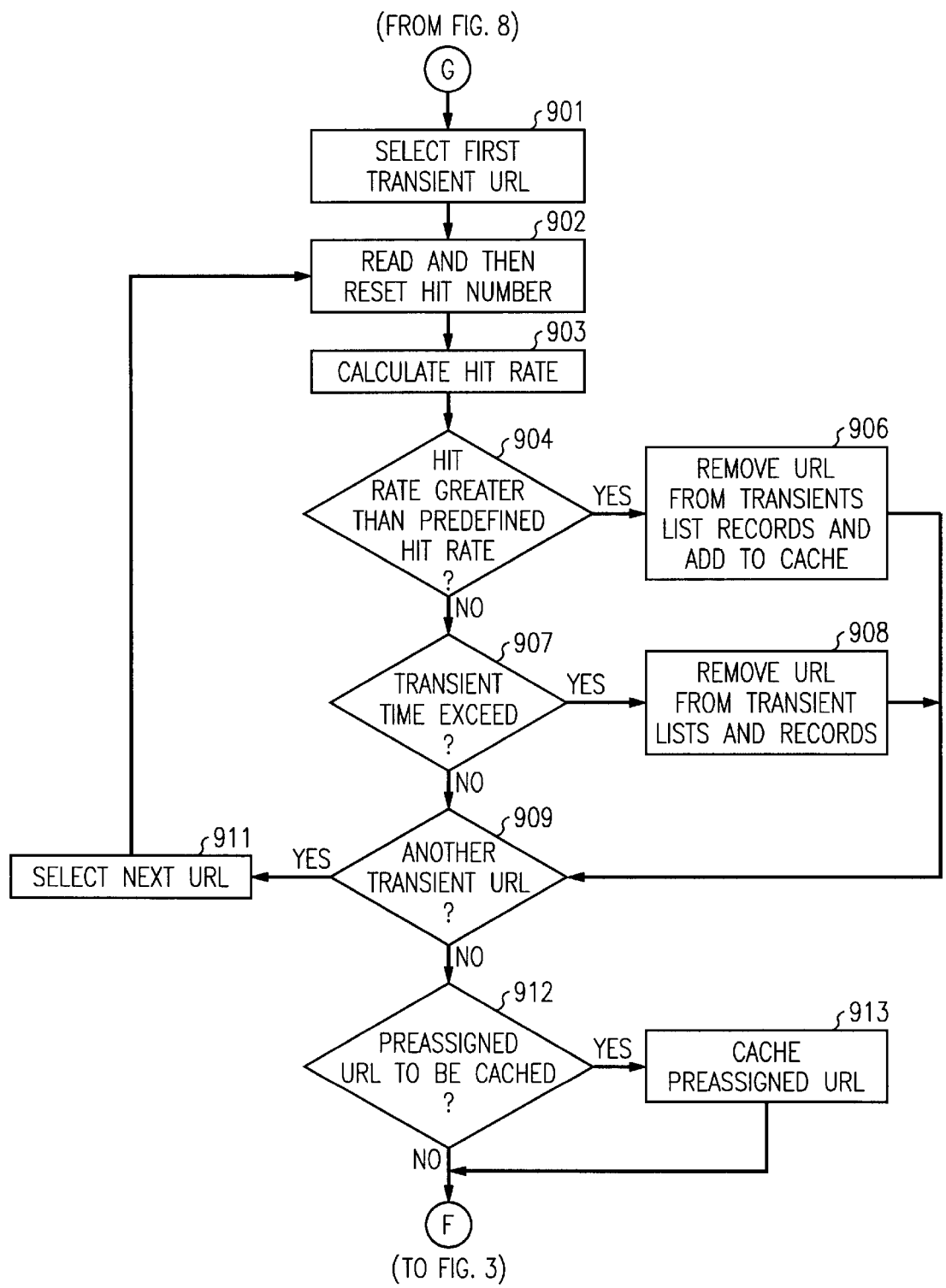
Figure 10:
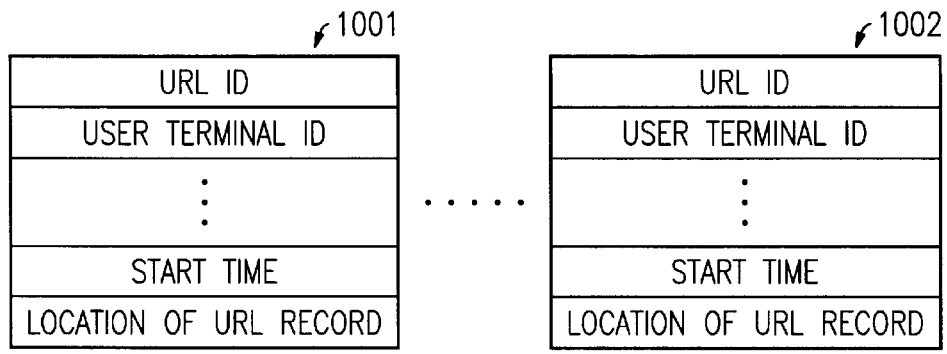
Figure 11:
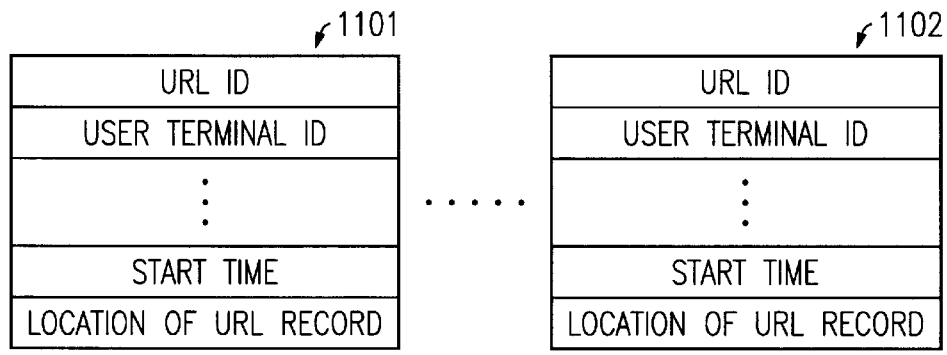
Figure 12:
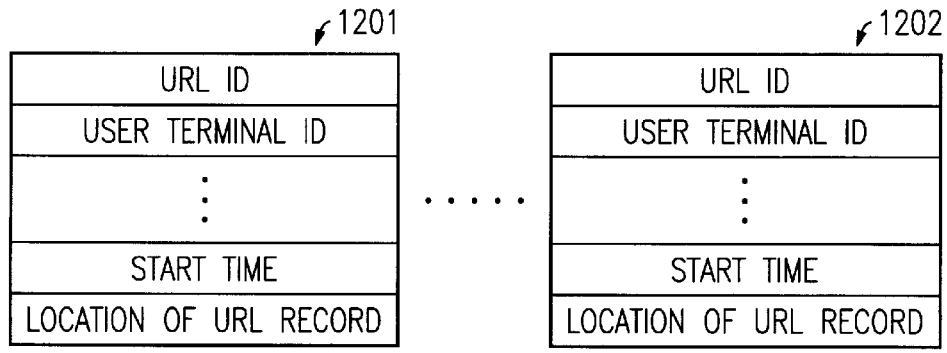

FIGS. 3–8 illustrate the steps performed by central computer 208 in transferring web pages to users utilizing PCs such as PC 103 or other user terminals. Initially, decision block 301 determines whether it is time to perform the statistical functions associated with maintaining web pages cached within central computer 208. These operations are illustrated in FIG. 9. If the answer in decision block 301 is no, decision block 302 determines if a user is requesting a web page. If the answer is yes, decision block 303 determines if the channel number and sequence key that will be utilized to transmit the web page to the users has been chosen. The channel number and sequence key are referred to as the transmit information. Note, that sequence supplemental information will be transmitted to the users at a later point in time before a web page is transmitted. Note, FIGS. 3–9 utilize the term "URL" to refer to the various mechanisms for identifying information related to a particular web page. Decision block 303 determines whether the transmit information has been selected by examining the records of FIG. 13 which define the cached URLs and the records of FIG. 14 which determine the transient URLs. For example, if field 1311 contains information in record 1301, this means that the channel number and sequence key have been determined for the URL determined by the "URL ID field" 1303. If the answer in decision block 303 is yes, block 304 utilizes the transmit information from the "transmit information" field of a URL list as illustrated in FIGS. 10–12 or 16–18 to send a user message to the user's PC defining the channel number and sequence number. If the answer in decision block 303 is no, the channel number and sequence number are determined for the URL, the channel number and sequence number are inserted into the transmit information field, and the transmit information is sent in a user message to the user's PC. After block 304 or 306 has been executed, control is transferred to decision block 307. Decision block 307 determines if the web page as identified by the URL has been cached. This determination is performed by scanning the "URL ID" field of lists 1301–1302 of FIG. 13. If the URL ID is found in one of the lists of FIG. 13, control is transferred to block 308 which updates the URL record by incrementing the "number of hits" field (e.g., field 1304 of FIG. 13) before transferring control to block 309. Block 309 inserts the user's identification information into the URL list for the cache tier that has been assigned to the user. The URL lists for cached URLs are illustrated in FIGS. 10–12. FIG. 10 illustrates the URL list for the first tier, FIG. 11 illustrates the URL list for the second tier, and FIG. 12 illustrates the URL list for the third tier. As can be seen from list 1001 of FIG. 10, each URL list comprises the "URL ID" field, followed by fields that are utilized to identify users' PCs in the "user terminal ID" fields. The final field of the URL list is the "location of URL record" which defines the location of a URL record such as illustrated in FIG. 13 If a URL list is not present in FIGS. 10–12 for the user's tier, block 309 creates a URL list in the correct tier for the requested URL. When block 309 creates a URL list, it inserts into the "start time" field of the URL list the time that the URL list was established. After execution of block 309, control is transferred back to decision block 301.

Figure 16:
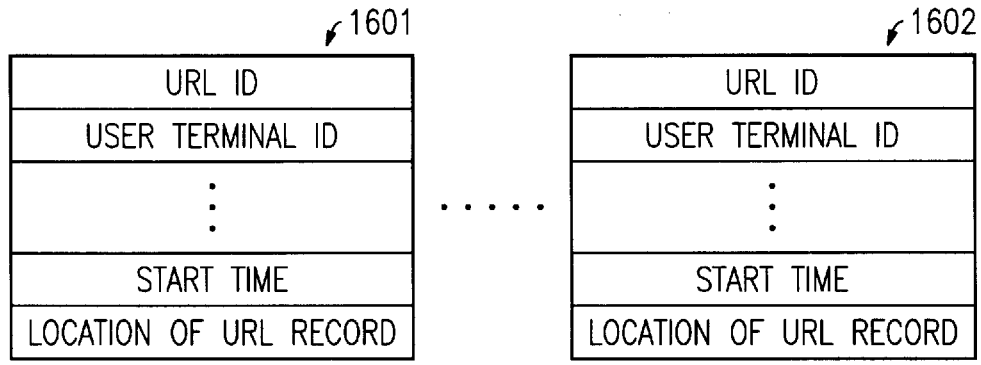
Figure 17:
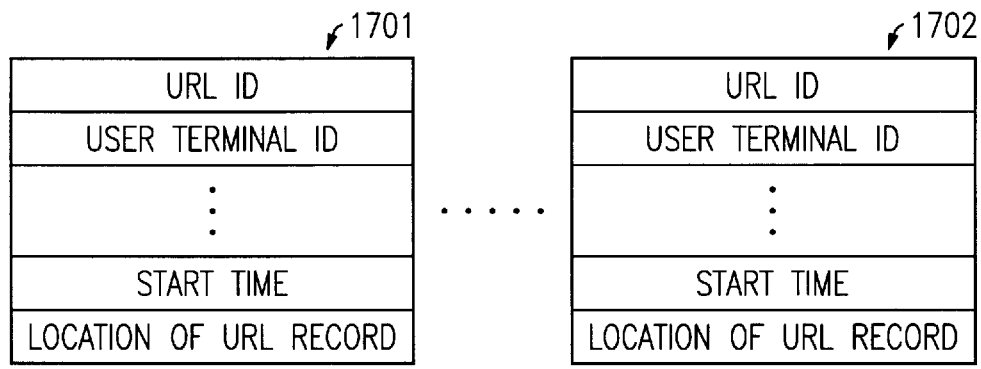
Figure 18:
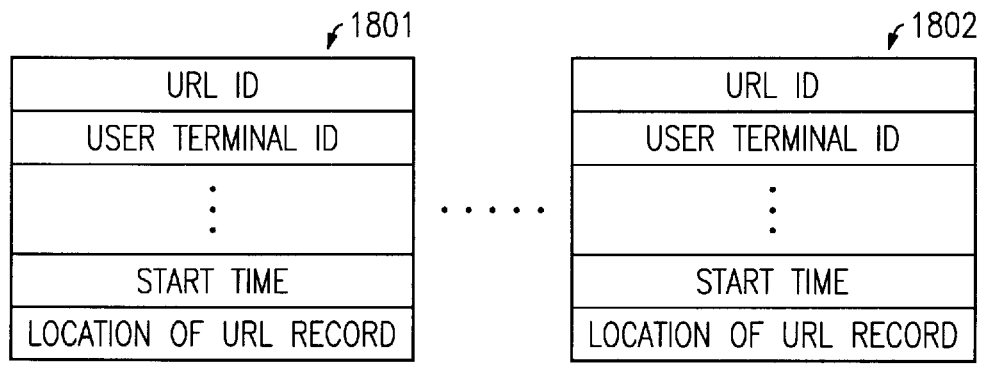

Returning to decision block 307, if the requested URL has not been cached, control is transferred to decision block 311 which determines if a transient URL has been set up for the requested URL. A transient URL is a URL for which at least one request has been received and has temporally been established to service that request. In addition, as will be explained later, a transient URL remains within central computer 208 for a period of time so as to allow the transient URL to become a cached URL if a sufficient number of requests are received within a predefined period of time for the transient URL. Decision block 311 determines if a transient URL record has been established by scanning the URL ID fields of the transient URL records 1401–1402 of FIG. 14. If the answer in decision block 311 is yes, block 317 updates the "number of hits" field of the appropriate transient URL record. Then, block 318 inserts the user identification into the transient URL list for the transients user's tier. FIG. 16 illustrates the transient URL list for the first transient tier, FIG. 17 illustrates the transient URL list for the second transient tier, and FIG. 18 illustrates the transient URL list for the third transient tier. If a transient URL list does not exist for the URL in the user's transient tier, block 318 will create the transient URL list in the correct transient tier as defined by the user rate of service.

Returning to decision block 311, if the transient URL is not present (set up) within central computer 208, block 312 requests the web page identified by the URL from web servers 207, block 313 waits until the web page is received from the appropriate web site before transferring control to block 314. Block 314 will establish a transient URL list in the user's tier as illustrated in FIGS. 16–18. Block 316 will set up a transient URL record in the records maintained in memory as illustrated in FIG. 14. Block 316 will insert into the new transient URL record the time that the record was set up and the transmit information that was determined in block 306. The transmit information determined in block 306 is temporally stored until the new transient URL record is established. After execution of either block 318 or 316, control is transferred back to decision block 301.

Figure 4:
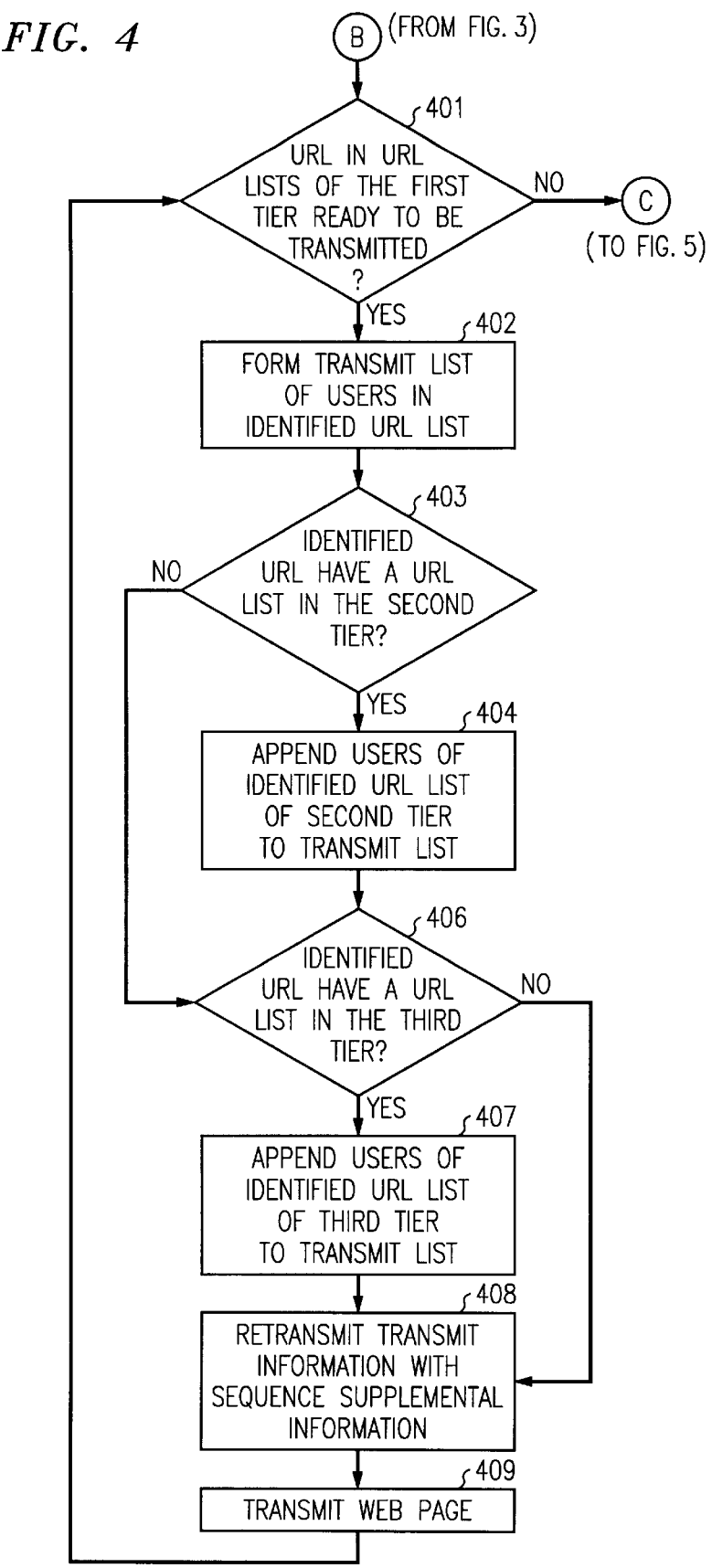
Figure 5:
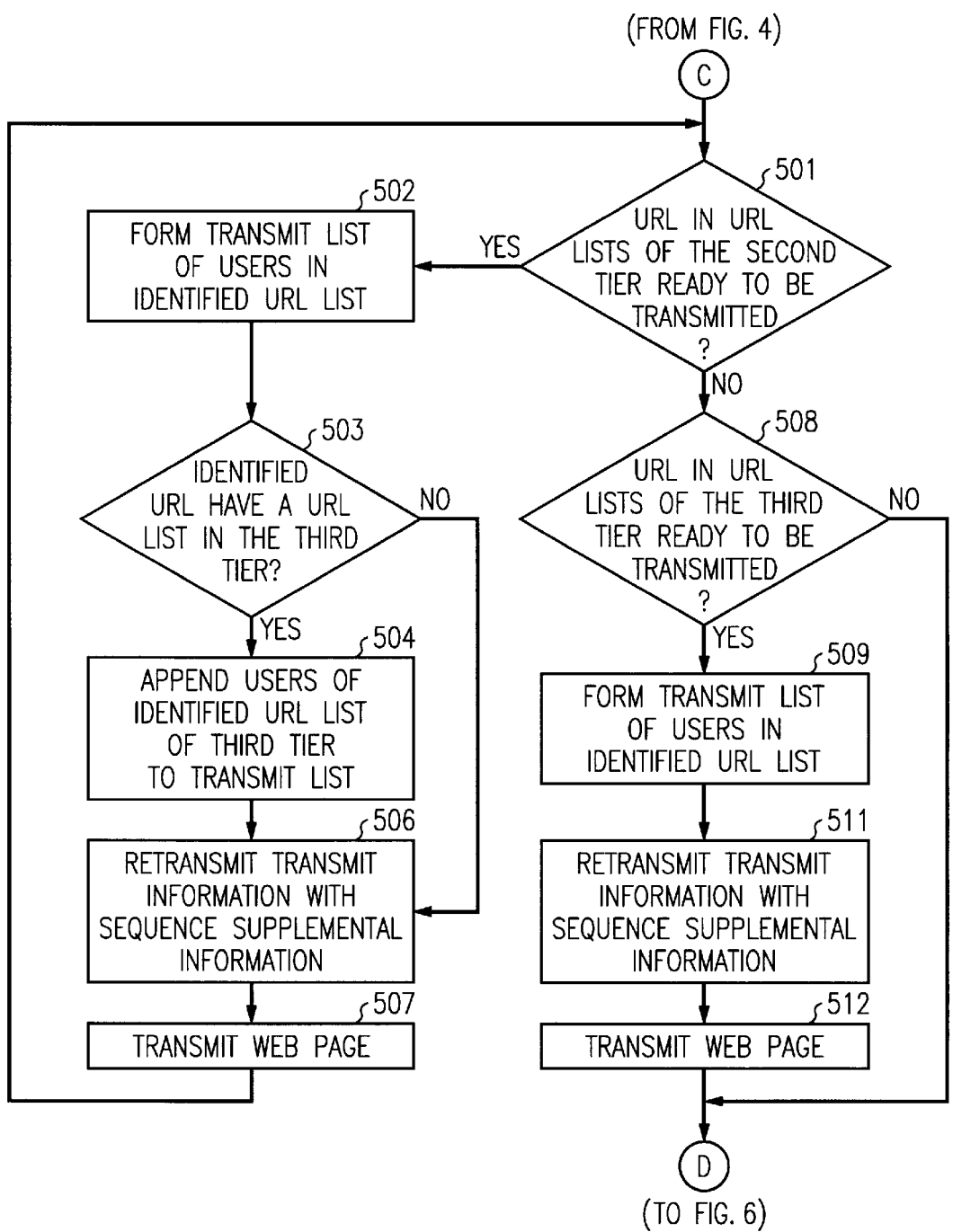
Figure 6:
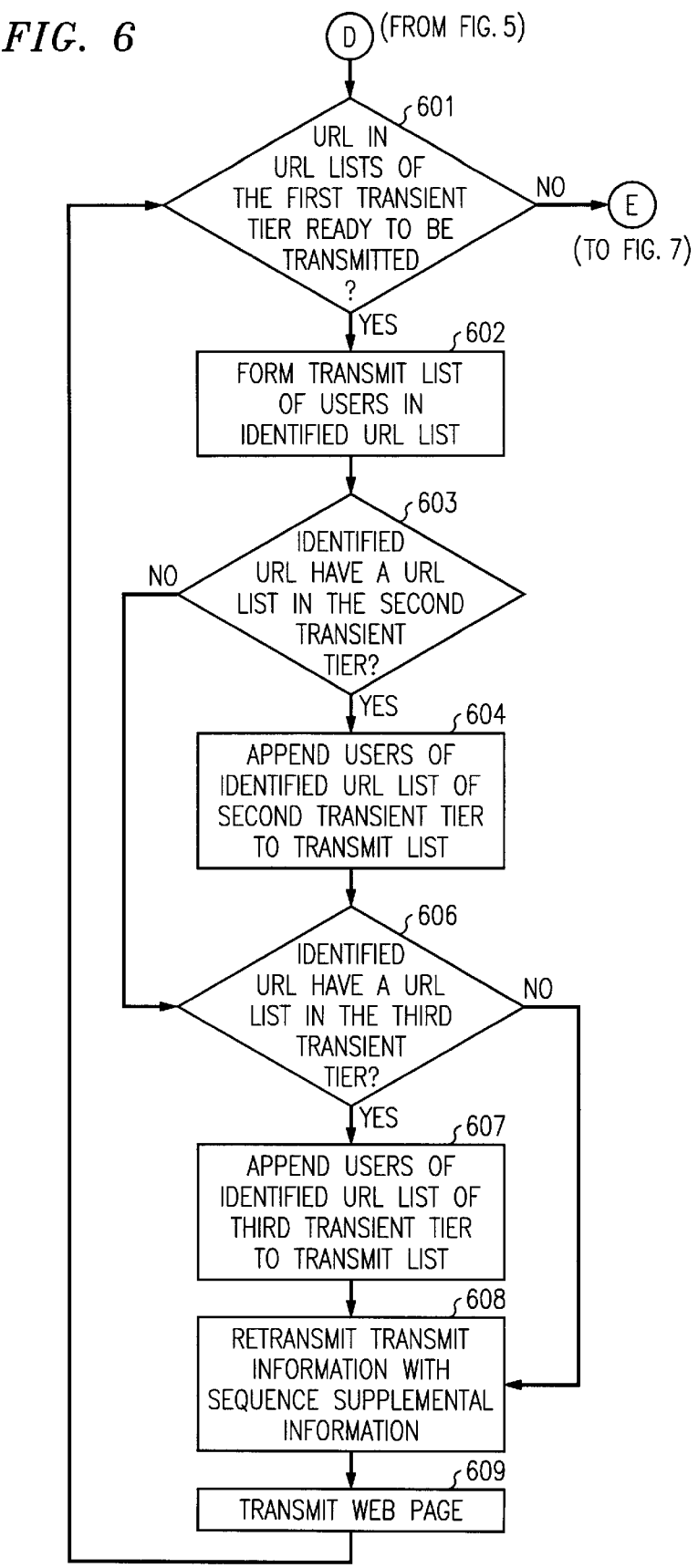
Figure 7:
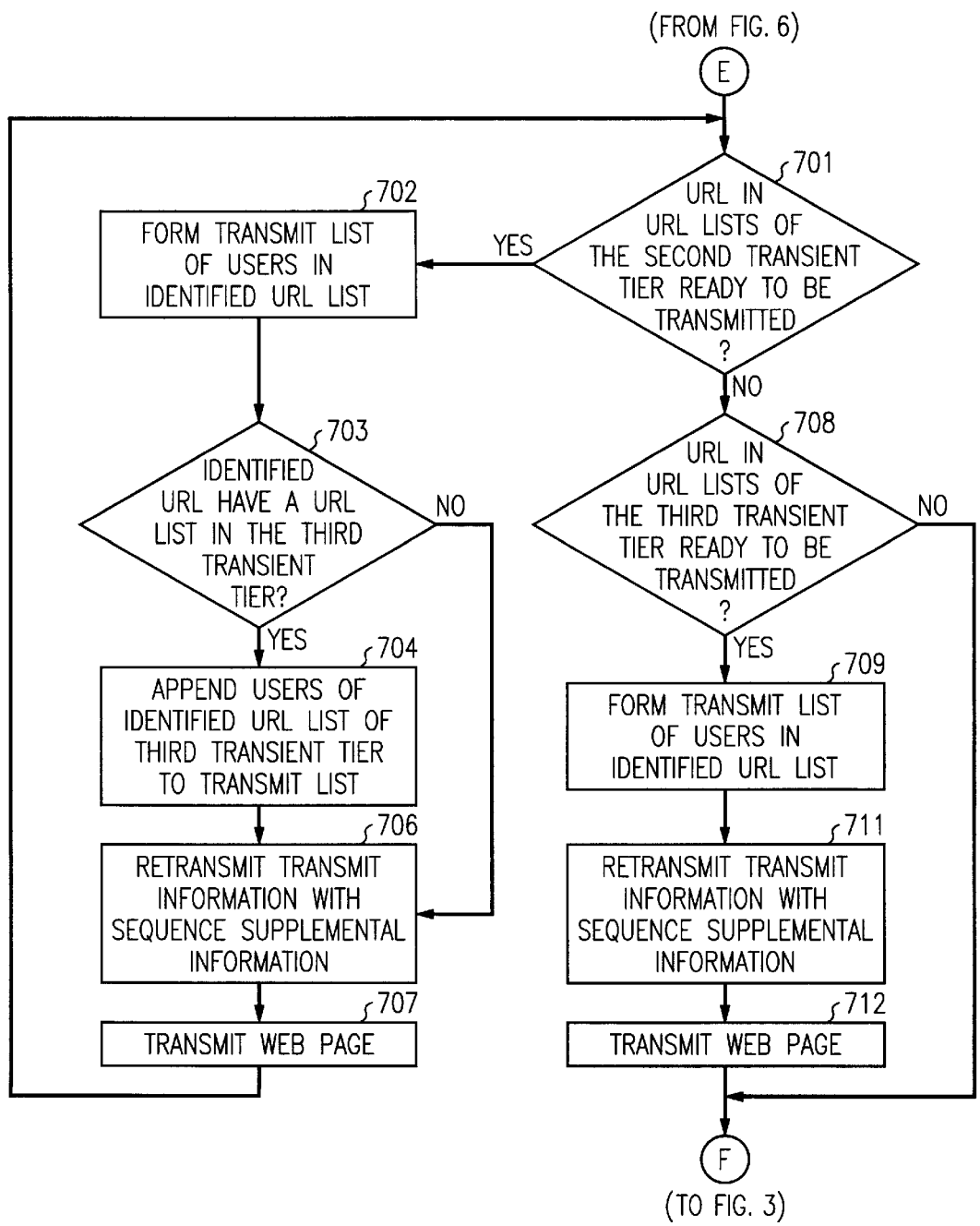

Returning to decision block 302, if the decision in block 302 was that the user is not requesting a web page, control is transferred to decision block 401 of page 4. The operations illustrated in FIGS. 4–7 are concerned with when web pages for the various tiers should be transmitted to users. FIGS. 4 and 5 are concerned with the transmission of web pages for cached URLs, and FIGS. 6 and 7 are concerned with the transmission of web pages in transient URLs. Decision block 401 determines if any web pages identified by URLs in URL lists 1001–1002 of FIG. 10 (first tier URL lists) are ready to be transmitted. If the answer is yes in decision block 401, block 402 forms a transmit list of users from the identified URL list in URL list 1001–1002. After execution of block 402, control is transferred to decision block 403 that determines if the URL identified in decision block 401 is also in a URL list in URL list 1101–1102 of FIG. 11 (second tier). If the answer is no in decision block 403, control is transferred to decision block 406. If the answer is yes in decision block 403, block 404 appends to the transmit list the users in the identified URL list of the second tier before transferring control to decision block 406.

Decision block 406 determines if the URL identified in decision block 401 has a URL list in URL list 1201–1202 of FIG. 12 (third tier). If the answer is no in decision block 406, control is transferred to block 408. However, if the answer in decision block 406 is yes, block 407 appends the user of the identified URL list of the third tier to the transmit list before transmitting control to block 408. Block 408 now retransmits the channel number, the sequence key and transmits the sequence supplemental information. The sequence supplemental information defines the size of the web page. Block 409 then broadcast transmits the web page via satellite dish 209. The execution of blocks 402, 404, and 407 results in the identified URL list being removed from the appropriate tier. After execution of block 409, control is transferred back to decision block 401 which then determines if there is another URL list in the first tier that is ready to be transmitted.

When the answer in decision block 401 is no, control is transferred to decision block 501. Blocks 501–507 examine the URL lists in the second tier to determine if any URLs are ready for transmission. Decision block 501 examines URL lists 1101–1102 of FIG. 11 (second tier). If the answer in decision block 501 is yes, control is transferred to block 502 which forms a transmit list of users based on the users listed in the identified URL list of the second tier. After execution of block 502, control is transferred to decision block 503. Decision block 503 determines if the identified URL in decision block 501 has an associated URL list in the third tier as illustrated in FIG. 12. If the answer is no, control is transferred to block 506. If the answer in decision block 503 is yes, block 504 appends the user of the identified URL list of the third tier to the transmit list. Blocks 506 and 507 transmit the web page and the transmit information to the users before returning control to decision block 501.

Returning to decision block 501, when the answer in decision block 501 is no, control is transferred to decision block 508 which determines if a URL in URL lists 1201–1202 of FIG. 12 (third tier) is ready for transmission. If the answer is yes, block 509 forms a transmit list of the users in the identified URL list and blocks 511 and 512 transmit the appropriate information to the users before control is transferred back to decision block 508. When the answer in decision block 508 is no, control is transferred to decision block 601 of FIG. 6.

The operations performed by the steps illustrated in FIGS. 6 and 7 are similar to those performed by the steps of FIGS. 4 and 5 with the exception that FIGS. 6 and 7 are determining if there are URLs in the transient first, second, and third list as illustrated in FIGS. 16–18 that are ready for transmission as opposed to the cache URL lists illustrated in FIGS. 10–12. After all the transient tiers have been examined, decision block 708 will transfer control back to decision block 301 of FIG. 3.

Figure 8:
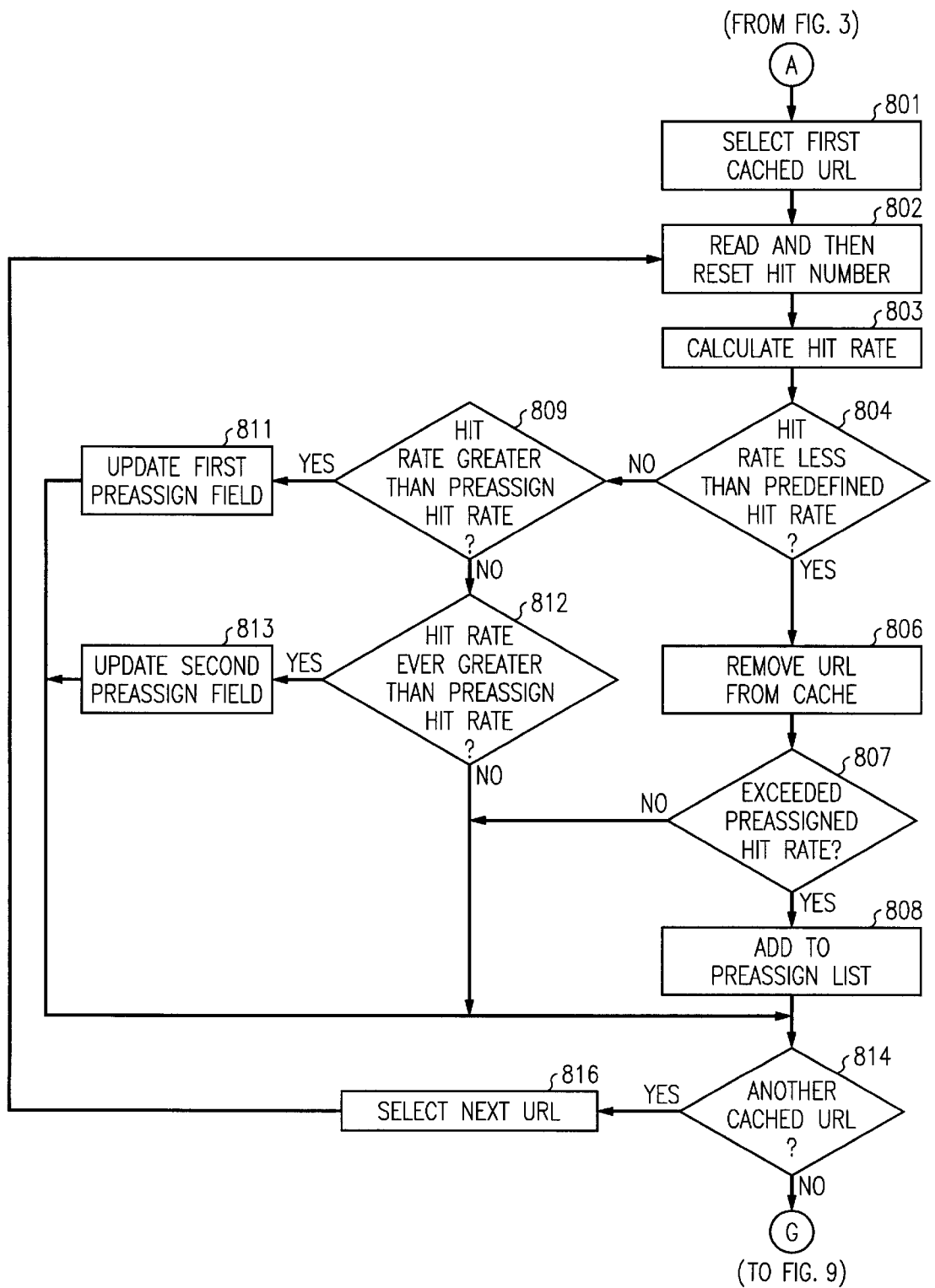
FIGS. 8–9 illustrate, in flow chart form, the steps performed by the central computer in determining the data that should be cached internal to the central computer.

Returning to decision block 301, if it is time to perform the statistical functions, the answer is yes in decision block 301, and control is transferred to block 801 of FIG. 8. Blocks 801–816 process the statistics associated with the cached URLs. These statistics determine whether a URL will be removed from a cache or whether a cached URL is one that should be precached at certain times of the week. Block 801 selects the first cached URL as defined in the URL records of FIG. 13. Block 802 reads the "number of hits" field from the URL record (e.g., 1304) and resets this number to zero. Decision block 803 utilizes the number of hits over the period since the last calculations to calculate a new hit rate which is inserted into the "hit rate" field (e.g., 1305) of the URL record.

After execution of block 803, control is transferred to decision block 804 which determines if the newly calculated hit rate is less than the predefined hit rate required to maintain a URL in the cache. If the answer is yes, block 806 removes the URL record from central computer. After execution of block 806, decision block 807 examines the "first and second preassigned" fields (e.g., 1307 and 1308) of the URL records. Entries in these two fields define the period in terms of day of the week and time of day during which the URL is to be precached into the cache because of high usage during these periods. If the answer in decision block 807 is yes, block 808 adds the identified URL to the preassigned table maintained in the memory of central computer 208 as illustrated in FIG. 14. Block 808 inserts the URL ID and the day of the week and time of day as defined by the "first preassigned" field of the URL record into FIG. 15. After execution of block 808, control is transferred to decision block 814. Decision block 814 determines if there is another cached URL record to be examined. If the answer is yes, block 816 selects this URL record before transferring control back to block 802.

Returning to decision block 804, if the hit rate is not less than the predefined hit rate, control is transferred to decision block 809. Blocks 809–813 are concerned with making the determination if a particular URL should be placed in the preassigned list illustrated in FIG. 15. URLs in the preassigned list of FIG. 15 are automatically cached by central computer 208 at the time indicated by the day of the week and time of day entry for the particular URL. This caching occurs before the hit rate would designate that the URL should be cached. This preassigning of URLs to be cached allows extremely high and predictable use of certain URLs to be utilized to provide better performance by central computer 208 to users. Decision block 809 determines if the hit rate is greater than the preassigned hit rate. If the answer is yes, block 811 inserts into the "first preassigned" field (e.g., 1307) of the appropriate URL record the present time as defined by the day of the week and time of day before transferring control to decision block 814. If the answer in decision block 809 is no, block 812 examines the content of the "first preassigned" field to determine if the hit rate had ever exceeded the preassigned hit rate. If the answer is yes, block 813 inserts the present time and day of the week into the "second preassigned" field (e.g., 1308) of the URL record. This "second preassigned" field is utilized to statistically determine overall periods of demand for certain highly utilized web pages. After execution of block 813 or if the answer in decision block 812 is no, control is transferred to decision block 814.

Returning to decision block 814, if there are no more cached URL records to be examined as illustrated in FIG. 13, control is transferred to block 901. Blocks 901–911 are concerned with the steps necessary to determine if a transient URL record should be removed or be converted to a cache URL record. Block 901 selects the first transient URL record and transfers control to block 902 which reads and then resets the "number of hits" field (e.g., 1404). Block 903 then calculates the hit rate and inserts this into the "hit rate" field (e.g., 1405) before transferring control to decision block 904. Decision block 904 determines if the hit rate is greater than the predefined hit rate. If the answer is yes, control is transferred to block 906 which removes the URL from the transient URL lists and records and adds it to cache lists and records before transferring control to decision block 909. Decision block 909 determines if there is another transient URL record to be examined. If the answer is yes, block 911 selects the next transient URL record before returning control to block 902.

Returning to decision block 904, if the hit rate is not greater than the predefined hit rate, decision block 907 examines the "time of set up" field (e.g., 1406) of the appropriate transient URL record to determine if the transient time has been exceeded. The transient time is the amount of time that a URL is allowed to remain in central computer 208 if it has not been converted to a cached URL. If the answer is yes in decision block 907, block 908 removes the URL from the transient lists and records before transferring control back to decision block 909. If the answer in decision block 907 is no, control is transferred to decision block 909.

Returning to decision block 909, if the answer is no, control is transferred to decision block 912 which examines the table of FIG. 15 to determine if it is time to precache a URL identified in the "URL ID" field of FIG. 15. If the answer is yes, block 913 requests the web page associated with the URL from web servers 207 and establishes a cached URL record in the URL records of FIG. 13 before transferring control to decision block 301 of FIG. 3. If the answer in decision block 912 is no, control is transferred to decision block 301 of FIG. 3.

It is to be understood that the above-described embodiment is merely illustrative of the principles of the invention and that other arrangements may be devised by those skilled in the art without departing from the spirit or scope of the invention. In particular, one skilled in the art would readily see that other types of transmission media could be utilized other than satellite transmission to perform the functions of satellite 211 or that satellite transmission could be combined with cable transmission on the receiving end to service a plurality of PCs from a single satellite downlink dish.

What is claimed is:

1. A method of providing information to a plurality of user terminals by use of a first table having a first plurality of subtables each identified with one of a plurality of rates of service and a second table having a second plurality of subtables each identified with one of the plurality of rates of service, comprising the steps of:

requesting information identified by one of a plurality of information identifiers by one of the plurality of user terminals from a central computer via service provider equipment;

adding identification of the one of the plurality of user terminals to one of the first plurality of subtables of the first table containing identifications of other ones of the plurality of user terminals that also requested the information identified by the one of the plurality of information identifiers upon the information identified by the one of the plurality of information identifiers being stored within the central computer;

adding the identification of the one of the plurality of user terminals to one of the second plurality of subtables of the second table upon the information identified by the one of the plurality of information identifiers not being stored within the central computer;

requesting the information identified by the one of the plurality of information identifiers from information provider equipment by the central computer upon the information identified by the one of the plurality of information identifiers not being stored within the central computer and storing the information identified by the one of the plurality of information identifiers within the central computer upon receipt of the information identified by the one of the plurality of information identifiers;

scanning periodically the ones of the plurality of subtables of the first table to determine if predefined times have elapsed for transmitting the information identified by the one of the plurality of information identifiers to ones of the plurality of user terminals whose identifications are in the ones of the plurality of subtables of the first table; and broadcast transmitting the information identified by the one of the plurality of information identifiers to ones of the plurality of user terminals whose identifications are in the ones of the plurality of subtables of the first table.

2. The method of claim 1 further comprises the steps of determining a first rate at which the plurality of user terminals are requesting the information identified by the one of the plurality of information identifiers if stored in the second table; and transferring the information identified by the one of the plurality of information identifiers from the second table to the first table upon the first rate exceeding a first predefined number.

3. The method of claim 2 further comprises the step of removing the information identified by the one of the plurality of information identifiers from the second table after a second predefined time has elapse if the first rate is less than the first predefined number.

4. The method of claim 3 further comprises the steps of determining a second rate at which the plurality of user terminals are requesting the information identified by the one of the plurality of information identifiers if stored in the first table; and removing the information identified by the one of the plurality of information identifiers from the first table if the second rate is less than the first predefined number.

5. The method of claim 4 further comprises the steps of statistically determining a time when the information identified by the one of the plurality of information identifiers after having been previously removed from the first table should be stored again in the first table;

requesting the information identified by the one of the plurality of information identifiers from the information provider equipment upon the determined time occurring; and storing the requested information identified by the one of the plurality of information identifiers in the first table.

6. The method of claim 1 wherein the step of adding to the first table comprises the step of determining a one of the first plurality of subtables based on one of the plurality of rates of service of the one of the plurality of user terminals; and the step of adding to the second table comprises the step of determining a one of the second plurality of subtables based on one of the plurality of rates of service of the one of the plurality of user terminals.

7. The method of claim 6 wherein the step of scanning periodically comprises the step of examining each of the first plurality of subtables to determine all of the plurality of user terminals waiting transmission of the information identified by the one of the plurality of information identifiers;

forming a transmit list of the determined ones of the plurality of user terminals waiting transmission; and the step of broadcast transmitting further transmits to all user terminals on the transmit list.

8. The method of claim 7 wherein the step of broadcast transmitting is performed via satellite transmission facilities.

9. The method of claim 8 wherein the plurality of information identifiers are universal resource identifiers, the information identified by the one of the plurality of information identifiers is an Internet web page, the service provider equipment is an Internet service provider, and information provider equipment is a plurality of Internet web sites.

10. The method of claim 4 wherein the first table comprises a first plurality of subtables each identified with one of a plurality of rates of service with the first plurality of subtables containing identified ones of the plurality of user terminals waiting transmission of information identified by ones of the plurality of information identifiers and the second table comprises a second plurality of subtables each identified with one of the plurality of rates of service with the second plurality of subtables containing identified ones of the plurality of user terminals waiting transmission of information identified by ones of the plurality of information identifiers, and the method further comprises the step of assigning each of the plurality of user terminals to one of the plurality of rates of service.

11. The method of claim 10 wherein the step of adding to the first table comprises the step of determining a one of the first plurality of subtables based on one of the plurality of rates of service of the one of the plurality of user terminals; and the step of adding to the second table comprises the step of determining a one of the second plurality of subtables based on one of the plurality of rates of service of the one of the plurality of user terminals.

12. The method of claim 11 wherein the step of scanning periodically comprises the step of examining each of the first plurality of subtables to determine all of the plurality of user terminals waiting transmission of the information identified by the one of the plurality of information identifiers;

forming a transmit list of the determined ones of the plurality of user terminals waiting transmission; and the step of broadcast transmitting further transmits to all user terminals on the transmit list.

13. The method of claim 12 wherein the step of broadcast transmitting is performed via satellite transmission facilities.

14. The method of claim 13 wherein the plurality of information identifiers are universal resource identifiers, the information identified by the one of the plurality of information identifiers is an Internet web page, the service provider equipment is an Internet service provider, and information provider equipment is a plurality of Internet web sites.

\* \* \* \* \*